United States Patent Office 3,792,014
Patented Feb. 12, 1974

3,792,014
PHENOL ANTIOXIDANT-GALLIC ACID ESTER
STABILIZER SYSTEM
Kryn G. Ihrman, Farmington, and Robert E. Malec,
Birmingham, Mich., assignors to Ethyl Corporation,
Richmond, Va.
No Drawing. Continuation-in-part of abandoned application Ser. No. 283,725, Aug. 25, 1972. This application Sept. 15, 1972, Ser. No. 289,536
Int. Cl. C08f 45/58
U.S. Cl. 260—45.85 B          22 Claims

ABSTRACT OF THE DISCLOSURE

Olefinic polymers (e.g., polyethylene) normally subject to accelerated oxidative degradation when used in contact with copper are stabilized for prolonged periods by inclusion of a hydrocarbyl ester of gallic acid (e.g., propyl gallate) together with a phenolic antioxidant for olefinic polymers. The compositions are especially useful for extending the service life of polyolefin copper wire insulation.

This application is a continuation-in-part of application Ser. No. 283,725, filed Aug. 25, 1972, now abandoned.

BACKGROUND

A wide range of antioxidants have been used in olefinic polymers with various degrees of effectiveness. The stabilizing problem becomes particularly acute when the polymer is used in contact with copper such as in electrical insulation for copper wire. Although many stabilizers provide adequate protection for the polymer under normal use, it has been found that when used in contact with copper the polymer fails prematurely, tending to crack and lose its electrical insulation properties. In fact, some types of oxidative deterioration have been reported to be more severe when a typical antioxidant is used than when none is used (Hansen et al., J. of Poly. Sci., Part A, 2, 587–609, 1964). At page 591, Hansen et al. report, "The induction period in oxygen at 140° C. for polypropylene stabilized by the addition of 0.5 weight percent of 4,4′ - thiobis-(3-methyl-6-tert-butylphenol) is decreased from about 400 hours to 40 hours by the presence of copper. Similar 90 percent losses in the effectiveness of this antioxidant in the presence of copper have been observed over a range of temperatures."

A number of compounds have been used to diminish the effect of copper. Most are metal deactivators or chelating agents such as N,N′-di-β-naphthyl-p-phenylenediamine, ethylenediamine tetraacetic acid, 2,2′-bipyridyl, 8-quinolinol, N,N′-di-salicylidine-1,2-propanediamine, and benzimidazole. Other compounds have been reported to diminish copper catalyzed degradation of olefinic polymers such as nitrobenzohydrazide, oxalydihydrazide, triazines, triazoles, triazolines and tetrazoles (Hansen et al., Polymer Eng. and Sci., 5, October 1965, 223–226). Other additives are reported by Dexter et al., U.S. Pat. 3,110,696; Bown et al., U.S. Pat. 3,117,104; Shell, British Pat. 994,-16; British Pat. 890,761; British Pat. 951,931; British Pat. 951,936; Hansen et al., U.S. Pat. 3,367,907; and Minigawa et al., U.S. Pat. 3,673,152. The foregoing indicates that extensive research has been conducted in this area and attests to the seriousness of the problem.

SUMMARY

It has now been found that the useful life of olefinic polymers used in contact with copper can be greatly extended by including in them a phenolic olefinic polymer antioxidant and a small amount of a hydrocarbyl ester of gallic acid.

DESCRIPTION OF THE PREFERRED
EMBODIMENTS

A preferred embodiment of this invention is a polymer of olefinically unsaturated monomers, which polymer is normally susceptible to accelerated oxidative degradation when in contact with copper, said polymer containing an antioxidant amount of a phenolic antioxidant for olefinic polymers and a promoter amount of a hydrocarbyl ester of gallic acid.

A broad range of polymers and copolymers or olefinically unsaturated monomers can be benefited by this invention such as polyethylene, polypropylene, ethylene-propylene copolymer, acrylonitrile-butadiene-styrene terpolymer, polystyrene, polyvinyl chloride, polyacrylonitrile, polymethylmethacrylates, polybutene, cis - polybutene, polychloroprene, polyisoprene, and the like. The preferred olefinic polymers are poly-α-olefins, especially polyethylene and polypropylene, and copolymers thereof.

Useful phenolic antioxidants for olefinic polymers include all those phenolic antioxidants normally used to stabilize olefinic polymers. Of course, the phenolic antioxidant is not a hydrocarbyl ester of gallic acid since this would not result in a combination within the present invention. The phenolic antioxidants contain one or more phenolic hydroxy groups, and one or more phenolic nuclei and can contain from about eight to about 300 carbon atoms. In addition, the phenolic nucleus can contain an oxy or thio ether group.

The alkyl-substituted phenols and polynuclear phenols, because of their molecular weight, have a higher boiling point, and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatibility with polyolefins, inasmuch as the phenolic compound then acquires more of an aliphatic hydrocarbon character, and therefore there is no upper limit on the number of alkyl carbon atoms. Usually, from the standpoint of availability, the compound will not have more than about 18 carbon atoms in an alkyl, alicyclidine and alkylene group, and a total of not over about 50 carbon atoms. The compounds may have from one to four alkyl radicals per phenol nucleus.

The phenol contains at least one phenolic hydroxyl. In the case of bicyclic phenols, the rings can be linked by thio or oxyether groups, or by alkylene, alicyclidene or arylidene groups.

Monocyclic phenols which can be employed have the structure:

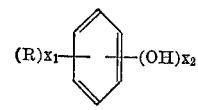

wherein R is selected from the group consisting of hydrogen; halogen; and organic radicals containing from one to about 30 carbon atoms, such as alkyl, aryl, alkenyl, alkaryl, aralkyl, cycloalkenyl, cycloalkyl, alkoxy, and acyl

where R' is aryl, alkyl or cycloalkyl.

$x_1$ and $x_2$ are integers from one to four, and the sum of $x_1$ and $x_2$ does not exceed six.

Examples of monocyclic phenols are 2,6-di-tert-butyl-p-cresol,
2,6-di-tert-butyl-4-n-butylphenol,
2,6-di-tert-butyl-4-chlorophenol,
2,6-di-tert-butyl-4-methoxyphenol,
2,6-di-tert-butyl-hydroquinone,
2-methyl-6-sec-triacontylphenol,
2,6-diisopropyl-4-n-butylphenol,
2,4,6-tri-tert-butylphenol,
2,6-dicyclohexyl-p-cresol, and the like.

Further representative phenolic antioxidants include guaiacol, resorcinol monoacetate, vanillin, butyl salicylate, 2,6-di-tert-butyl-4-methyl phenol, 2-tert-butyl-4-methoxy phenol, 2,4-dinonyl phenol, 2,3,4,5-tetradecyl phenol, tetrahydro-α-naphthol, o-, m- and p-cresol, o-, m- and p-phenylphenol, o-, m- and p-xylenols, the carvenols, symmetrical xylenol, thymol, o-, m- and p-nonylphenol, o-, m- and p-dodecyl phenol, and o-, m- and p-octyl phenol, o- and m-tert-butyl-p-hydroxy-anisole, p-n-decyloxy phenol, p-n-decyloxy cresol, nonyl n-decyloxy cresol, eugenol, isoeugenol, glyceryl monosalicylate, methyl - p - hydroxy-cinnamate, 4 - benzyloxyphenol, p - acetylaminophenol, p - stearyl-aminophenol, methyl-p-hydroxybenzoate, p-di-chlorobenzoyl-aminophenol and p-hydroxysalicyl anilide.

Exemplary polyhydric phenols are orcinol, catechol, resorcinol, 4-octyl resorcinol, 4-dodecyl resorcinol, 4-octadecyl catechol, 4-isooctyl-phloroglucinol, pyrogallol, hexahydroxy benzene, 4-isohexylcatechol, 2,6-di-tertiary-butyl resorcinol, 2,6-diisopropyl phloroglucinol.

Polycyclic phenols include aromatic nuclei which are linked by a bivalent linking radical, and are defined by the formula:

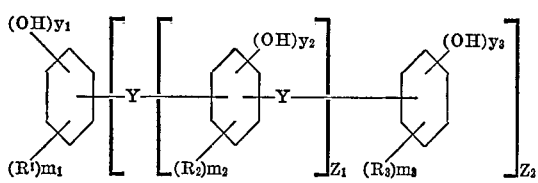

wherein $R_1$, $R_2$ and $R_3$ are inert substituent groups of the type of R above, Y is a bivalent linking radical; $m_1$ is an integer from 0 to a maximum of $5-(z_2+y_1)$, $m_2$ can be an integer from 0 to 3 and $m_3$ an integer from 0 to 4, $z_1$ can be an integer from 0 to about 6 and $z_2$ an integer from 1 to 5, preferably 1. Preferably, the hydroxyl groups in polycyclic phenols are located ortho and/or para to Y. There can be one or more hydroxyl groups per phenyl nucleus, $y_1$, $y_2$ and $y_3$ representing the number thereof. Preferably, there will be only one hydroxyl group per phenyl nucleus. The phenolic hydroxyl may be either hindered, i.e., substituted in both positions ortho to the hydroxyl group, or partially hindered or unhindered, i.e., substituted in one or neither position.

Y can be a single bond, as in diphenyl, or a bivalent group, such as:

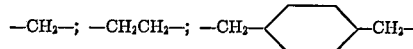

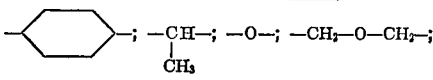

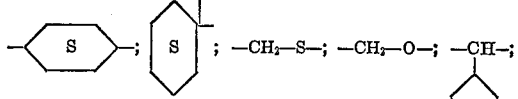

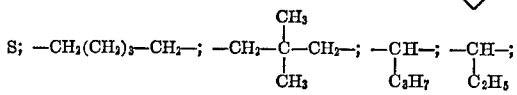

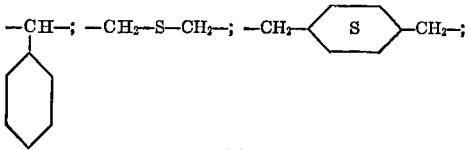

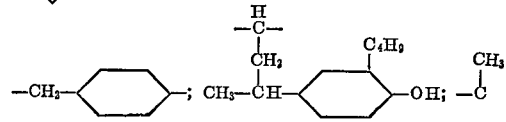

Representative examples include 4,4'-methylenebis(2,6-di-tert-butylphenol),
4,4'-bis(2,6-di-tert-butylphenol),
4,4'-thiobis(2-tert-butyl-5-methylphenol),
4,4'-thiobis(2,6-di-tert-butylphenol),
4,4'-isopropylidene bis(2-methyl-6-tert-amylphenol),
4,4'-oxybis(2,6-di-sec-decylphenol),
α,α'-thiobis(2,6-di-tert-butyl-p-cresol),
α,α'-oxybis(2,6-di-tert-butyl-p-cresol),
2,2'-methylenebis(4-methyl-6-tert-butylphenol),
4,4'-benzylidene bis(2-methyl-6-tert-octylphenol),
2,2'-cyclohexylidene bis(4-methyl-6-tert-dodecylphenol),
2,2'-bis(4-hydroxy phenyl)propane,
methylenebis(p-cresol),
4,4'-oxobis(3-methyl-6-isopropyl phenol),
2,2'-oxobis(4-dodecyl phenol),
4,4'-n-butylidene bis(2-tertiary butyl-5-methylphenol),
4,4'-benzylidene-(2-tertiary butyl-5-methylphenol),
4,4'-cyclohexylidenebis(2-tertiary butylphenol),
4,4'-thiobisphenol,
4,4'-thiobis(3-methyl-6-tertiary-butylphenol),
2,2'-thiobis(4-methyl-6-tertiary-butylphenol),
2,2'-methylenebis(4-methyl-6-(1'-methyl-cyclohexyl)-phenol),
2,6-bis(2'-hydroxy-3'-tertiary-butyl-5'-methylbenzyl)-4-methylphenol,
1,1,3-tris(2'-methyl-4'-hydroxy-5'-tertiary butylphenyl) butane.

Phenolic phosphites are useful in the present invention. These are phosphite esters which contain at least one hydroxy-substituted benzene ring. They are phosphorous acid esters of polyhydroxy-substituted mononuclear phenols or esters of polynuclear phenols containing at least two hydroxy on the same or different benzene nuclei.

Exemplary of the phenolic phosphites are:

bis(4,4'-thiobis(2-tertiary butyl-5-methyl-phenol) isooctyl phosphite,
mono(4,4'-thio-bis(2-tertiary-butyl-5-methyl phenol) diphenyl phosphite,
tri-(4,4'-n-butylidene-bis(2-tertiary-butyl-5-methylphenol) phosphite,
4,4'-benzylidene-bis(2-tertiary-butyl-5-methyl-phenol) diphenyl phosphite, isooctyl 2,2'-bis(-parahydroxyphenyl) propane phosphite,
tridecyl 4,4'-n-butylidene-bis(2-tertiary butyl-5-methyl-phenol) phosphite,
4,4'-thiobis(2-tertiary butyl-5-methylphenol) phosphite,
2-ethylhexyl-2,2'-methylene-bis-(4-methyl-6-1'-methyl-cyclohexyl) phenol phosphite,
tri(-2,2'-bis-(parahydroxy phenyl) propane phosphite,
tri(-4,4'-thio-bis-(2-tertiary-butyl-5-methyl-phenol) phosphite,
isooctyl-(2,6-bis(2'-hydroxy-3,5-dinonylbenzyl)-4-nonyl phenyl) phosphite,
tetratridecyl-4,4'-n-butylidene-bis(2-tertiary butyl-5-methyl phenyl) diphosphite,
tetra-isooctyl 4,4'-thiobis(2-tertiary butyl-5-methyl phenyl) diphosphite,
2,2'-methylene-bis(4-methyl-6-1'-methyl cyclohexyl phenyl) polyphosphite,
isooctyl-4,4'-isopropylidene-bis-phenyl-polyphosphite,
2-ethylhexyl-2,2'-methylene-bis(4-methyl-6,1'-methyl-cyclohexyl) phenyl triphosphite,
tetratridecyl-4,4'-oxydiphenyl diphosphite,
tetra-n-dodecyl-4,4'-n-butylidenebis(2-tertiary-butyl-5-methylphenyl) diphosphite,
tetratridecyl-4,4'-isopropylidene bisphenyl diphosphite,
hexa-tridecyl butane, 1,1,3-tris(2'-methyl-5'-tertiary-butylphenyl-4'-) triphosphite,
di-(3,5-di-tert-butyl-4-hydroxyphenyl) octadecyl phosphite,
di-octadecyl(3,5-di-tert-butyl-4-hydroxyphenyl) phosphite, and the like.

Another useful class of phenolic antioxidants for olefinic polymers are the dialkyl hydroxyphenyl phosphonates as described by Knapp, U.S. 3,155,704, and Spivack, U.S. 3,281,505. Representative examples of these are:

di-n-amyl(α-methyl-3-ethyl-5-isopropyl-4-hydroxy-benzyl) phosphonate;
di-n-decyl(α-amyl-3-n-octyl-5-n-dodecyl-4-hydroxy-benzyl) phosphonate;
di-3'-dodecyl[α-(4'-undecyl)-3-n-propyl-5-tert-butyl-4-hydroxybenzyl] phosphonate;
di-2'-octyl(α-n-propyl-3-n-nonyl-4-hydroxybenzyl) phosphonate;
di-n-undecyl[α-(3'-heptyl-3-n-hexyl-5-n-butyl-4-hydroxy-benzyl] phosphonate;
di-n-butyl(α-p-hexylphenyl-3,5-diisopropyl-4-hydroxy-benzyl) phosphonate;
di-3'-chloro-n-heptyl(3-n-dodecyl-5-methyl-4-hydroxy-benzyl) phosphonate;
di-4'-dodecyl(3-n-propyl-5-n-octyl-4-hydroxybenzyl) phosphonate;
diethyl(3-methyl-5-amyl-4-hydroxybenzyl) phosphonate;
di-2'-bromo-butyl(3-methyl-5-tert-butyl-4-hydroxy-benzyl) phosphonate;
diamyl(3-n-butyl-5-tert-butyl-4-hydroxybenzyl) phosphonate;
di-n-heptyl[3-methyl-5-(3'-n-dodecyl)-4-hydroxy-benzyl] phosphonate;
di-sec-butyl(3,5-di-tert-butyl-4-hydroxybenzyl) phosphonate;
di-n-dodecyl(3-isopropyl-5-n-dodecyl-4-hydroxybenzyl) phosphonate;
dimethyl(3,5-di-tert-butyl-4-hydroxybenzyl) phosphonate;
diethyl(3,5-di-tert-butyl-4-hydroxybenzyl) phosphonate;
diisopropyl(3,5-di-tert-butyl-4-hydroxybenzyl) phosphonate;
di-sec-butyl(3,5-di-tert-butyl-4-hydroxybenzyl) phosphonate;
di-n-hexyl(3,5-di-tert-butyl-4-hydroxybenzyl) phosphonate;
di-n-docosyl 3,5-di-tert-butyl-4-hydroxybenzyl phosphonate;
di-n-hexadecyl 3,5-di-tert-butyl-4-hydroxybenzyl phosphonate;
di-n-octadecyl 3,5-di-tert-butyl-4-hydroxybenzyl phosphonate; and
di-n-dodecyl-2-(3',5'-di-tert-butyl-4'-hydroxyphenyl) ethane phosphonate.

In a highly preferred embodiment the antioxidant compound is a tris hydroxyphenyl propane having the structure

wherein R is selected from the group consisting of hydrogen and methyl, X is selected from the group consisting of 3-methyl-6-tert-butyl-hydroxyphenyl attached to the carbon atom directly by its ortho position and 3-methyl-6-tert-butyl-hydroxyphenyl attached to the carbon atom directly by its para position and Y is selected from the group consisting of hydrogen and X with one Y being hydrogen and one Y being the same as X. These olefinic polymer antioxidants are described by Ranson, U.S. 3,196,185.

In another highly preferred embodiment the antioxidant is a 4-$C_{1-20}$ alkyl-2,6-di-tert-$C_{4-12}$ alkylphenol such as 2,6-di-tert-butyl-p-cresol,
2,6-di-tert-butyl-4-ethylphenol,
2,6-di-tert-butyl-4-n-butylphenol,
2,4,6-tri-tert-butylphenol,
2,6-di-tert-butyl-4-n-decylphenol,
2,6-di-tert-butyl-4-n-dodecylphenol,
2,6-di-tert-octyl-4-methylphenol,
2,6-di-tert-dodecyl-4-n-dodecylphenol,
2,6-di-tert-eicosyl-4-n-butylphenol, and the like.

Excellent results are obtained when the antioxidant compound is an alkanol or alkane polyol ester of a di-lower alkyl hydroxyphenyl alkanoic acid such as described in Dexter et al., U.S. 3,285,855. A preferred member of this class is pentaerythritol tetrakis-[3-(3,5-di-tert-butyl-4-hydroxyphenyl)propionate], also named tetra-[methylene 3-(3,5 - di-tert-butyl-4-hydroxyphenyl)propionate] methane. Further examples are:

n-octadecyl 3,5-di-tert-butyl-4-hydroxyphenylacetate
n-octadecyl 3,5-di-tert-butyl-4-hydroxybenzoate
n-hexyl 3,5-di-tert-butyl-4-hydroxyphenylbenzoate
n-dodecyl 3,5-di-tert-butyl-4-hydroxyphenylbenzoate
neo-dodecyl 3-(3,5-di-tert-butyl-4-hydroxyphenyl) propionate
dodecyl β-(3,5-di-tert-butyl-4-hydroxyphenyl)propionate
ethyl α-(4-hydroxy-3,5-di-tert-butylphenyl)isobutyrate
octadecyl α-(4-hydroxy-3,5-di-tert-butylphenyl) isobutyrate
octadecyl α-(4-hydroxy-3,5-di-tert-butylphenyl) propionate
n-octadecyl-β-(3,5-di-tert-butyl-4-hydroxyphenyl) propionate
2-(n-octylthio)ethyl 3,5-di-tert-butyl-4-hydroxybenzoate
2-(n-octylthio)ethyl 3,5-di-tert-butyl-4-hydroxyphenylacetate
2-(n-octadecylthio)ethyl 3,5-di-tert-butyl-4-hydroxyphenylacetate
2-(n-octadecylthio)ethyl 3,5-di-tert-butyl-4-hydroxybenzoate
2-(2-hydroxyethylthio)ethyl 3,5-di-tert-butyl-4-hydroxybenzoate β,β-thiodiethyl bis-(3,5-di-tert-butyl-4-hydroxyphenylacetate
diethylene glycol bis-[3-(3,5-di-tert-butyl-4-hydroxyphenyl)propionate]
2-(n-octadecylthio)ethyl 3-(3,5-di-tert-butyl-4-hydroxyphenyl)propionate]
thio-bis-[ethylene 3-(3,5-di-tert-butyl-4-hydroxyphenyl)propionate]
n-butylimino N,N-bis-[ethylene-3-(3,5-di-tert-butyl-4-hydroxyphenyl)propionate]
2-(2-stearoyloxyethylthio)ethyl 3,5-di-tert-butyl-4-hydroxybenzoate
2-(2-hydroxyethylthio)ethyl 7-(3-methyl-5-tert-butyl-4-hydroxyphenyl)heptanoate
2-(2-stearoyloxyethylthio)ethyl 7-(3-methyl-5-tert-butyl-4-hydroxyphenyl)heptanoate
1,2-propylene glycol bis-[3-(3,5-di-tert-butyl-4-hydroxyphenyl)-propionate]
ethylene glycol bis-[3-(3,5-di-tert-butyl-4-hydroxyphenyl)propionate]
neopentylglycol bis-[3-(3,5-di-tert-butyl-4-hydroxyphenyl)propionate]
ethylene glycol bis-(3,5-di-tert-butyl-4-hydroxyphenylacetate)
glycerine-1-n-octadecanoate-2,3-bis-(3,5-di-tert-butyl-4-hydroxyphenylacetate)
tetra-[methylene 3-(3,5-di-tert-butyl-4-hydroxyphenyl)propionate]methane
n-propyl 1,1,1-tris-[methylene 3-(3,5-di-tert-butyl-4-hydroxyphenyl)propionate]
sorbitol hexa-[3-(3,5-di-tert-butyl-4-hydroxyphenyl)propionate]
1,2,3-butanetriol tris-[3-(3,5-di-tert-butyl-4-hydroxyphenyl)propionate]
2-hydroxyethyl 7-(3-methyl-5-tert-butyl-4-hydroxyphenyl)heptanoate
2-stearoyloxyethyl 7-(3-methyl-5-tert-butyl-4-hydroxyphenyl)heptanoate
n-ethyl 1,1,1-tris[methylene 3-(3,5-di-tert-butyl-4-hydroxyphenyl)propionate]

In another embodiment the antioxidant compound is a phosphite, phosphate, thiophosphite, or thiophosphate of a dialkyl hydroquinone. Representative examples of these are:

3,5-di-tert-butyl-4-hydroxyphenyl phosphite
2,5-di-tert-butyl-4-hydroxyphenyl phosphite
3-methyl-5-tert-butyl-4-hydroxyphenyl phosphite
2-methyl-5-tert-butyl-4-hydroxyphenyl phosphite
2,5-di-tert-amyl-4-hydroxyphenyl phosphite
3,5-di-tert-butyl-4-hydroxyphenyl phosphate
2,5-di-tert-butyl-4-hydroxyphenyl phosphate
3-methyl-5-tert-butyl-4-hydroxyphenyl phosphate
2-methyl-5-tert-butyl-4-hydroxyphenyl phosphate
2,5-di-tert-amyl-4-hydroxyphenyl phosphate
3,5-di-tert-butyl-4-hydroxyphenyl thiophosphite
2,5-di-tert-butyl-4-hydroxyphenyl thiophosphite
3-methyl-5-tert-butyl-4-hydroxyphenyl thiophosphite
2-methyl-5-tert-butyl-4-hydroxyphenyl thiophosphite
2,5-di-tert-amyl-4-hydroxyphenyl thiophosphite
3,5-di-tert-butyl-4-hydroxyphenyl thiolphosphate
2,5-di-tert-butyl-4-hydroxyphenyl thiolphosphate
3-methyl-5-tert-butyl-4-hydroxyphenylthiolophosphate
2-methyl-5-tert-butyl-4-hydroxyphenyl thiolophosphate
2,5-di-tert-amyl-4-hydroxyphenyl thiolophosphate
3,5-di-tert-butyl-4-hydroxyphenyl thionophosphate
2,5-di-tert-butyl-4-hydroxyphenyl thionophosphate
3-methyl-5-tert-butyl-4-hydroxyphenyl thionophosphate
2-methyl-5-tert-butyl-4-hydroxyphenyl thionophosphate
2,5-di-tert-amyl-4-hydroxyphenyl thionophosphate Of the foregoing, the preferred antioxidants are tri-(3,5-di-tert-butyl-4-hydroxyphenyl) phosphite and tri-(3,5-di-tert-butyl-4-hydroxyphenyl) phosphate.

Superior results are obtained when the antioxidant compound is a tris(3,5-dialkyl-4-hydroxybenzyl)benzene as described by Rocklin et al., U.S. 3,026,264. Of this class, the most preferred additive is 1,3,5-trimethyl-2,4,6-tri-(3,5-di-tert-butyl-4-hydroxybenzyl)benzene.

The amount of antioxidant used need only be a small antioxidant amount. A useful concentration is from about 0.05 to 1 weight percent. In general, good results are obtained using about 0.05 to 0.5 weight percent.

The hydrocarbyl gallate promoter may be an alkyl, cycloalkyl, alkaryl, aralkyl or aryl gallate. Representative examples of alkyl gallates are methyl gallate, ethyl gallate, n-propyl gallate, isopropyl gallate, n-butyl gallate, sec-butyl gallate, n-hexyl gallate, isohexyl gallate, n-octyl gallate, isooctyl gallate, sec-octyl gallate, 2-ethylhexyl gallate, n-decyl gallate, n-dodecyl gallate, sec-dodecyl gallate, n-eicosyl gallate, and the like, including mixtures thereof, such as a mixture of n-decyl and n-dodecyl gallate.

Useful cycloalkyl gallates include cyclohexyl gallate, cyclooctyl gallate, 4-ethylcyclohexyl gallate, and the like.

Alkaryl gallates include 2-tert-butylphenyl gallate, phenyl gallate, 4-methylphenyl galate, 2,4-di-tert-butypheny gallate, 4-ethylphenyl galate, 4-sec-octylphenyl gallate, and the like.

The aralkyl gallates are represented by compounds such as benzyl gallate, 4-phenylbenzyl gallate, α-methylbenzyl gallate, α,α-dimethybenzyl gallate, 2-phenylethyl gallate, 3-phenylpropyl gallate, 3-(α-naphthyl)propyl gallate, and the like.

Typical aryl gallates are phenyl gallate, α-naphthyl gallate, β-naphthyl gallate, and the like.

Preferred gallates are the alkyl gallates in which the alkyl group contains from 1 to about 20 carbon atoms such as methyl gallate, propyl gallate, decyl gallate, dodecyl gallate, and eicosyl gallate.

The amount of hydrocarbyl gallate should be a promoter amount. By this is meant an amount sufficient to at least reduce the detrimental effect of copper on the polymer containing the antioxidant. A useful promoter range is from about 0.005 to about 1 weight percent. A preferred range is from about 0.05 to about 0.5 weight percent.

Light stabilizers for olefin polymers can also be added, for example, 2-hydroxy benzophenones, o-hydroxyphenylbenzotriazoles, 1-dioxides of α,β-benzoisothiazolones and 1,3,5-triazines and nickel organophosphites as disclosed in U.S. Pat. No. 3,395,112. Known synergists for phenolic antioxidants can be included in the polymer in addition to the combination of gallate ester and phenolic antioxidant. Examples of such synergists are dialkylthiodialkanoates such as dilaurylthiodipropionate.

Tests have been carried out to demonstrate the effectiveness of hydrocarbyl gallates in reducing the detrimental effect of copper on phenolic antioxidant stabilized olefinic polymers. In these tests, low density polyethylene was compounded to contain typical phenolic antioxidants widely used in olefinic polymers, alone and in combination with the gallate promoter. The polyethylene was pressed into 10 mil sheets and placed on a clean copper surface in an air circulating oven at 105° C. Criteria of effectiveness was the hours to polymer failure as evidenced by tearing of the polymer sheet when moderately stretched. The olefinic polymer phenolic antioxidant included in the test were:

(A) pentaerythritol tetrakis[3-(3,5-di-tert-butyl - 4 - hydroxyphenyl)propionate]
(B) 1,3,5-tri-methyl-2,4,6-tri-(3,5-di-tert-butyl-4-hydroxybenzyl)benzene
(C) 1,1,3-tri-(2-methyl-5-tert-butyl - 4 - hydroxyphenyl)butane
(D) 4,4'-thiobis(3-methyl-6-tert-butylphenol)

The following table shows the test results.

| Test No. | Additive | Conc. (wt. percent) | Hours to failure Without copper | Hours to failure With copper |
|---|---|---|---|---|
| 1 | None | | 120 | 72 |
| 2 | Propyl gallate | 0.1 | | 168 |
| 3 | | 0.2 | | 168 |
| 4 | Dodecyl gallate | 0.1 | | 336 |
| 5 | | 0.2 | | 360 |
| 6 | "A" | 0.1 | 2,952 | 456 |
| 7 | "A" plus Propyl gallate | 0.1 0.1 | | 1,200 |
| 8 | "B" | 0.1 | 2,784 | 408 |
| 9 | "B" plus Propyl gallate | 0.1 0.1 | | 1,416 |
| 10 | "B" plus Decyl dodecyl gallate | 0.1 0.1 | | 1,536 |
| 11 | "C" plus Propyl gallate | 0.1 0.1 | | 1,128 |
| 12 | "C" plus Decyl dodecyl gallate | 0.1 0.1 | | 1,248 |
| 13 | "D" | 0.1 | 1,104 | 456 |
| 14 | "D" plus Propyl gallate | 0.1 0.1 | | 600 |
| 15 | "D" plus Decyl dodecyl gallate | 0.1 0.1 | | 696 |

Test No. 1 shows the detrimental effect of copper on the polymer. Its service life was reduced 40%. The percent reduction in expected service life was even more severe in polymers containing an antioxidant. For example, in test No. 6 using 0.1% additive A a catastrophic 84.5% reduction was observed. Likewise, in test No. 8 using 0.1% additive B the reduction in service life due to copper was 85.4%.

As shown by tests Nos. 2, 3, 4 and 5, the gallate esters themselves are not very effective. With propyl gallate at either 0.1 or 0.2 weight percent the polymer endured only 168 hours. Since the polymer alone lasted 72 hours, the improvement due to propyl gallate is only 96 hours. Surprisingly, when used in combination with a standard phenolic antioxidant for olefinic polymers the improvement is vastly greater. For example, as shown by test No. 7, the addition of 0.1 weight percent propyl gallate to polymer containing 0.1 percent additive A gave a 744 hour increase. Likewise, as shown in test No. 9, when used with additive B the improvement was 1008 hours—a 347% improvement. With decyl dodecyl gallate mixture as shown in test No. 10 the improvement was even greater—1128 hours, or a 376% improvement. These results clearly show the unexpected results due to the use of a hydrocarbyl gallate ester in combination with a standard olefinic polymer phenolic antioxidant.

Because of the excellent stability that the combination of a phenolic antioxidant and a hydrocarbyl gallate impart to polyolefins in contact with copper, a highly preferred embodiment of the invention is a copper wire suitable for conducting electrical current having an electrical insulative coating of a poly-α-olefin containing an antioxidant amount of a phenolic antioxidant for olefinic polymers and a promoter amount of a hydrocarbyl ester of gallic acid.

We claim:

1. A polymer of an olefinically unsaturated monomer, said polymer normally susceptible to accelerated oxidative degradation when in contact with copper, said polymer containing an antioxidant amount of a phenolic antioxidant selected from the group consisting of:
(A) alkanol or alkane polyol esters of 3,5-dialkyl-4-hydroxy-phenylalkanoic acids,
(B) tris(3,5-dialkyl-4-hydroxybenzyl) benzenes, and
(C) tris hydroxyphenyl propanes having the structure

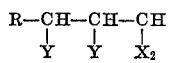

wherein R is selected from the group consisting of hydrogen and methyl, X is selected from the group consisting of 3-methyl-6-tert-butyl-hydroxyphenyl attached to the carbon atom directly by its ortho position and 3-methyl-6-tert-butyl-hydroxyphenyl attached to the carbon atom directly by its para position, and Y is selected from the group consisting of hydrogen and X with one Y being hydrogen and one Y being the same as X, and an amount sufficient to reduce the detrimental effects of copper of a hydrocarbyl ester of gallic acid or mixture of such esters, said hydrocarbyl group containing from 1 to about 20 carbon atoms.

2. A composition of claim 1 wherein said polymer is a poly-α-olefin.

3. A composition of claim 2 wherein said phenolic antioxidant is 1,3,5-tri-methyl-2,4,6-tri-(3,5-di-tert-butyl-4-hydroxybenzyl)benzene.

4. A composition of claim 3 wherein said hydrocarbyl ester is an alkyl gallate, said alkyl containing 1–20 carbon atoms.

5. A composition of claim 2 wherein said poly-α-olefin is polyethylene.

6. A composition of claim 5 wherein said hydrocarbyl ester is an alkyl gallate, said alkyl containing 1–20 carbon atoms.

7. A composition of claim 6 wherein said phenolic antioxidant is 1,3,5-tri-methyl-2,4,6-tri-(3,5-di-tert-butyl-4-hydroxybenzyl)benzene.

8. A composition of claim 7 wherein said alkyl gallate is propyl gallate.

9. A composition of claim 7 wherein said alkyl gallate is dodecyl gallate.

10. A composition of claim 7 wherein said alkyl gallate is a mixture of decyl and dodecyl gallates.

11. A composition of claim 6 wherein said phenolic antioxidant is the pentaerythritol tetraester of 3-(3,5-di-tert-butyl-4-hydroxyphenyl) propionic acid.

12. A composition of claim 6 wherein said phenolic antioxidant is a tris-(hydroxyphenyl) propane having the structure

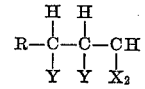

wherein R is selected from the group consisting of hydrogen and methyl, X is selected from the group consisting of 3-methyl-6-tert-butyl hydroxyphenyl attached to the carbon atom directly by its ortho position and 3-methyl-6-tert-butyl-hydroxyphenyl attached to the carbon atom directly by its para position and Y is selected from the group consisting of hydrogen and X with one Y being hydrogen and one Y being the same as X.

13. A composition of claim 11 wherein said alkyl gallate is propyl gallate.

14. A composition of claim 11 wherein said alkyl gallate is a mixture of decyl and dodecyl gallates.

15. A composition of claim 12 wherein said alkyl gallate is propyl gallate.

16. A composition of claim 12 wherein said alkyl gallate is a mixture of decyl and dodecyl gallates.

17. An article of manufacture comprising copper wire having an electrical insulation coating of a poly-α-olefin, said poly-α-olefin containing an antioxidant amount of a phenolic antioxidant selected from the group consisting of:
(A) alkanol or alkane polyol esters of 3,5-dialkyl-4-hydroxy-phenylalkanoic acids,
(B) tris(3,5-dialkyl-4-hydroxybenzyl) benzenes, and
(C) tris hydroxyphenyl propanes having the structure

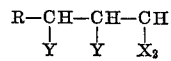

wherein R is selected from the group consisting of hydrogen and methyl, X is selected from the group consisting of 3-methyl-6-tert-butyl-hydroxyphenyl attached to the carbon atom directly by its ortho position and 3-methyl-6-tert-butyl-hydroxyphenyl attached to the carbon atom directly by its para position, and Y is selected from the group consisting of hydrogen and X with one Y being hydrogen and one Y being the same as X,
and an amount sufficient to reduce the detrimental effects of copper of a hydrocarbyl ester of gallic acid or mixture of such esters, said hydrocarbyl group containing from 1 to about 20 carbon atoms.

18. An article of claim 17 wherein said phenolic antioxidant is 1,3,5-tri-methyl-2,4,6-tri-(3,5-di-tert-butyl-4-hydroxybenzyl)benzene.

19. An article of claim 18 wherein said poly-α-olefin is a polyethylene.

20. An article of claim 19 wherein said hydrocarbyl ester of gallic acid is an alkyl gallate, said alkyl containing 1–20 carbon atoms.

21. An article of claim 20 wherein said alkyl gallate is propyl gallate.

22. An article of claim 20 wherein said alkyl gallate is a mixture of decyl and dodecyl gallates.

References Cited
UNITED STATES PATENTS

| | | | |
|---|---|---|---|
| 2,789,912 | 4/1957 | Gleim | 260—45.9 |
| 2,721,804 | 10/1955 | Rosenwald | 260—45.85 |
| 2,925,400 | 2/1960 | Tholstrup et al. | 260—45.85 |
| 2,921,048 | 1/1960 | Bell et al. | 260—45.85 |
| 3,196,185 | 1/1965 | Ranson | 260—45.95 |
| 3,342,637 | 9/1967 | Jaffe | 260—45.95 |
| 3,285,855 | 11/1966 | Dexter et al. | 260—45.85 |

DONALD E. CZAJA, Primary Examiner

V. P. HOKE, Assistant Examiner

U.S. Cl. X.R.

117—232; 260—45.7 P, 45.95 H, 45.95 R